(12) United States Patent
Lee et al.

(10) Patent No.: US 9,000,326 B2
(45) Date of Patent: Apr. 7, 2015

(54) APPARATUS FOR LASER PROCESSING

(75) Inventors: Yu-Lin Lee, New Taipei (TW);
Yung-Hsiang Huang, New Taipei (TW);
Tai-Wei Wu, New Taipei (TW);
Shun-Han Yang, New Taipei (TW);
Gong-Qian Wang, Taoyuan County (TW)

(73) Assignee: Hortek Crystal Co. Ltd., Hsinchu County (TW)

( * ) Notice: Subject to any disclaimer, the term of this patent is extended or adjusted under 35 U.S.C. 154(b) by 745 days.

(21) Appl. No.: 13/194,958

(22) Filed: Jul. 31, 2011

(65) Prior Publication Data

US 2012/0034328 A1 Feb. 9, 2012

(30) Foreign Application Priority Data

Aug. 4, 2010 (TW) .............................. 99126004 A (51) Int. Cl.
| | | |
|---|---|---|
| *B23K 26/00* | (2014.01) | |
| *B23K 26/06* | (2014.01) | |
| *G09G 3/00* | (2006.01) | |
| *B28B 17/00* | (2006.01) | |
| *B23K 26/08* | (2014.01) | |
| *B23K 26/38* | (2014.01) | |

(Continued)

(52) U.S. Cl.
CPC ........... *B23K 26/063* (2013.01); *B23K 26/0869* (2013.01); *B23K 26/383* (2013.01); *B23K 26/385* (2013.01); *B23K 26/4065* (2013.01); *H01S 3/2232* (2013.01)

(58) Field of Classification Search
CPC ............. B23K 26/063; B23K 26/0869; B23K 26/385; B23K 26/4065; B23K 26/383; H01S 3/2232
USPC ........................... 219/121.61, 121.6, 121.62, 219/121.73–121.77; 345/168; 425/174.4
IPC ........................................................ B29C 35/08
See application file for complete search history.

(56) References Cited

U.S. PATENT DOCUMENTS

| | | | | |
|---|---|---|---|---|
| 4,701,591 A | * | 10/1987 | Masaki et al. | ........... 219/121.77 |
| 4,734,558 A | * | 3/1988 | Nakano et al. | ........... 219/121.73 |
| 4,752,669 A | * | 6/1988 | Sharp et al. | ............... 219/121.67 |

(Continued)

FOREIGN PATENT DOCUMENTS

| | | |
|---|---|---|
| JP | 2008-207210 A | 9/2008 |
| KR | 2006-0099517 A | 9/2006 |
| KR | 10-0951721 B1 | 9/2009 |

OTHER PUBLICATIONS

Office action (mailed Aug. 8, 2012) from KIPO in a counterpart Korean patent application No. 10-2010-0138302.

*Primary Examiner* — Dana Ross
*Assistant Examiner* — Gyounghyun Bae
(74) *Attorney, Agent, or Firm* — The PL Law Group, PLLC (57) ABSTRACT

An apparatus for laser processing a board is provided. The apparatus for laser processing a board includes a chip, a laser, a modulating device and a focus device. The chip receives a first frequency signal to generate a second frequency signal. The laser receives the first frequency signal to emit a first laser beam. The modulating device receives the second frequency signal and the first laser beam, and adjusts the first laser beam to emit a second laser beam. The focus device focuses the second laser beam to emit a third laser beam onto the board for forming plural dots on the board.

18 Claims, 5 Drawing Sheets

(51) Int. Cl.
*B23K 26/40* (2014.01)
*H01S 3/223* (2006.01)

(56) References Cited

U.S. PATENT DOCUMENTS

| | | | | |
|---|---|---|---|---|
| 5,194,723 | A * | 3/1993 | Cates et al. | 250/205 |
| 5,270,643 | A * | 12/1993 | Richardson et al. | 324/754.22 |
| 5,463,200 | A * | 10/1995 | James et al. | 219/121.68 |
| 5,985,056 | A * | 11/1999 | McCay et al. | 148/511 |
| 6,028,288 | A * | 2/2000 | Moriike | 219/121.69 |
| 6,765,663 | B2 * | 7/2004 | Byren et al. | 356/152.1 |
| 6,998,567 | B2 * | 2/2006 | Yeik | 219/121.61 |
| 7,196,693 | B2 * | 3/2007 | Chien et al. | 345/168 |
| 7,892,952 | B2 * | 2/2011 | Yamazaki et al. | 438/487 |
| 8,235,296 | B2 * | 8/2012 | Idaka | 235/487 |
| 8,482,713 | B2 * | 7/2013 | Qi et al. | 349/187 |
| 2003/0086449 | A1 * | 5/2003 | Jacquet et al. | 372/25 |
| 2004/0135992 | A1 * | 7/2004 | Munro | 356/4.01 |
| 2005/0087522 | A1 * | 4/2005 | Sun et al. | 219/121.71 |
| 2005/0184036 | A1 * | 8/2005 | Hunter et al. | 219/121.69 |
| 2006/0054602 | A1 * | 3/2006 | Kidokoro et al. | 219/121.61 |
| 2007/0164004 | A1 * | 7/2007 | Matsuda et al. | 219/121.61 |
| 2007/0199927 | A1 * | 8/2007 | Gu et al. | 219/121.69 |
| 2007/0240325 | A1 * | 10/2007 | Pelsue et al. | 33/707 |
| 2008/0094640 | A1 * | 4/2008 | Cordingley et al. | 356/614 |
| 2008/0099453 | A1 * | 5/2008 | Smart | 219/121.67 |
| 2008/0105663 | A1 * | 5/2008 | Hunt et al. | 219/121.69 |
| 2008/0105664 | A1 * | 5/2008 | Smart | 219/121.72 |
| 2009/0007933 | A1 * | 1/2009 | Thomas et al. | 134/1 |
| 2009/0095722 | A1 * | 4/2009 | Ehrmann et al. | 219/121.72 |
| 2009/0107962 | A1 * | 4/2009 | Munroe et al. | 219/121.67 |
| 2009/0174632 | A1 * | 7/2009 | Hajjar et al. | 345/81 |
| 2009/0194516 | A1 * | 8/2009 | Deshi | 219/121.71 |
| 2009/0236323 | A1 * | 9/2009 | Sun et al. | 219/121.71 |
| 2009/0242522 | A1 * | 10/2009 | Baird et al. | 219/121.61 |
| 2010/0062214 | A1 * | 3/2010 | Wo et al. | 428/131 |
| 2010/0089881 | A1 * | 4/2010 | Bruland et al. | 219/121.68 |
| 2010/0140235 | A1 * | 6/2010 | Sun et al. | 219/121.67 |
| 2012/0092755 | A1 * | 4/2012 | Baird et al. | 359/328 |

* cited by examiner

APPARATUS FOR LASER PROCESSING

CROSS REFERENCE TO RELATED APPLICATIONS

The application claims the benefit of Taiwan Patent Application No. 099126004, filed on Aug. 31, 2010, at the Taiwan Intellectual Property Office, the disclosures of which are incorporated herein in their entirety by reference.

FIELD OF THE INVENTION

The present invention relates to an apparatus for laser processing, especially to an apparatus for laser processing a board to form dots on the board with excellent uniformity in the radii and depths of the dots and the capability for customization.

BACKGROUND OF THE INVENTION

Generally speaking, the backlight modules can be divided into an edge lighting type and a bottom lighting type based on the screen sizes. These two types are introduced as follows.

Figure 1:
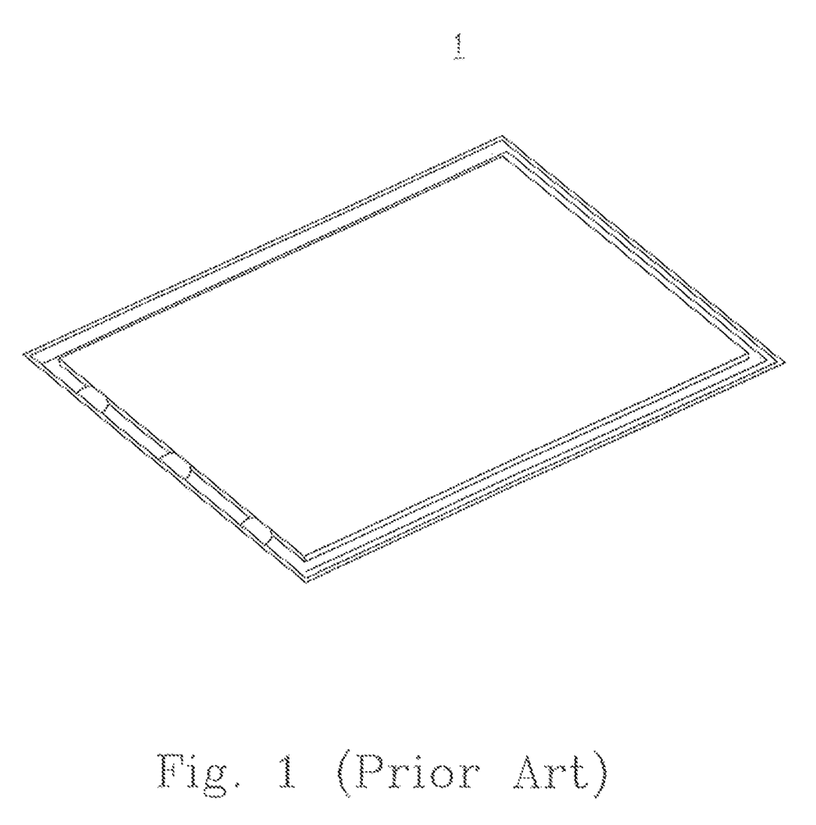
FIG. 1 is the schematic diagram showing the appearance and structure of a conventional backlight module by adopting the conventional edge lighting type.

The light source of the edge lighting type is located on a single edge or dual edges for emitting light laterally from the side edge(s) as shown in FIG. 1. The light guiding board 1 is manufactured by cutting or by molding without printing. Usually, the edge lighting type is adopted for the design of the backlight module with the screen size smaller than 20 inch with the characteristics of light weight, slim shape and narrow frame. The edge lighting type is adopted as the main stream design for the backlight modules for cellular phones, personal digital assistants, lap top computers and monitors of desk top computers.

For backlight modules with ultra large screens, the edge lighting type cannot provide any advantage on the aspects of weight, power and brightness. Therefore, the backlight module of the bottom lighting type is developed with the light source disposed right below the screen without the light guiding board. For the bottom lighting type, the light from the self-emitting source, e.g. fluorescent lamp, light emitting diode (LED), etc., passes through the diffusion plate upwards, is evenly distributed and is emitted from the front surface of the screen. Since the room to accommodate the light sources becomes larger for the bottom lighting type, more lamps can be used depending on the screen size of the LCD panel. However, by using such configurations for the bottom lighting type, the thickness, weight and consumed power of the backlight module are increased.

The light guiding board is an important component to affect the is illuminating efficiency in view of the illuminating structure of the backlight module of the edge lighting type. Currently, there are two processes for manufacturing the light guiding board in the industry. One manufacturing process adopts the injection molding technique for molding the poly (methyl methacrylate) (PMMA) grains after being melted under high temperature. The other manufacturing process is done by cutting the large flat PMMA plate and by printing the material, e.g. $SiO_2$ and $TiO_2$, with high reflection and low absorption onto the bottom surface of the PMMA plate to form dots by using silk screening printing method. The Table 1 for comparing these two processes is listed as follows.

TABLE 1

| Dot type | Printed light guiding plate | | Non-printed light guiding plate Processing for dots | | |
|---|---|---|---|---|---|
| | Cutting a raw plate for post silk screening printing | | Integral forming of shape & dots | Cutting the raw plate for post-processing | |
| | UV base | Solvent base | Injection molding | Non-contact (Laser) | Contact (Thermal forming) |
| Optical efficiency | X | ○ | ○ | Δ | ○ |
| Optical modification & elasticity | ○ | ○ | Δ | X | Δ |
| Production optical stability | Δ | X | ○ | Δ | Δ |
| Production dimensional stability | ○ | ○ | Δ | Δ | X |
| Production capacity per unit time | ○ | ○ | X | X | Δ |
| Facility cost | ○ | Δ | X | Δ | X |
| Developing capability for large size | ○ | ○ | X | Δ | Δ |
| Developing capability for wedge board | Δ | X | ○ | X | X | where the symbol "○" denotes "excellent", the symbol "Δ" denotes "fair", and the symbol "X" denotes "poor".

Unfortunately, when the edge lighting type is adopted for the backlight module based on the screen size and when the LEDs are used as the light sources, the issue of non-uniform illumination often occurs no matter a printed light guiding board or a non-printed light guiding board is used, due to the diffusion angle of the illumination for the LED. The positions located within the diffusion angle of the LED and close to the LED are brighter; while the positions located at a middle point between two LEDs and at the edge are darker.

Currently, there are two technical strategies to solve the issue. For the first strategy, the light sources are treated by using the optical cup or lens to enlarge the diffusion angle of the illumination for the LED, or by aligning several LEDs in a row to allow the overlaps of the diffusion angles among the several LEDs so as to look like a linear light source, e.g. cold cathode fluorescent lamp, or by disposing several LEDs at the corner with multiple illumination angles, so as to increase the uniformity of the illumination of LEDs and to diminish the dark band in the edge. However, all these methods will raise the cost. For the second strategy, the surface of the light guiding board is treated to break the total internal reflection and to allow the light to pass through the surface. The bottom of the light guiding board is introduced with the diffusion dots distributed at various densities over the bottom. These diffusion dots can be manufactured by ink painting, chemical etching or other methods. Since the light intensity is higher at the positions close to the light sources, the diffusion dots at these positions are designed to have smaller sizes and lower densities, and vice versa. In addition, the alignments of the diffusion dots are designed by disposing the diffusion dots in the concentric distribution or in sectional distribution to adjust the longitudinal and transverse densities, so as to adjust the brightness of the place close to the light source and to compromise the brightness insufficiency in the edge by setting the different density of dots according to the light energy distributions of the LEDs.

However, as the panel size is increased, e.g. larger than 37 inch, the size of the light guiding board is increased. For the light guiding board with such a large size, the technical strategy of forming the diffusion dots at the bottom of the light guiding board may fail.

Therefore, the present invention provides a customizable laser processing apparatus able to be used for large size panels for forming dots on the surface of the light guiding board with excellent uniformity on the appearances, radii and depths of the dots.

For overcoming the mentioned drawbacks existing in the conventional techniques, a customer-adjustable laser processing apparatus is provided based on the inventive concept of the present invention regarding the large dimensional panel and the forming of dots on the surface of the light guiding board by controlling the shapes, radii and depths of the dots for reflection.

SUMMARY OF THE INVENTION

The present invention provides a laser processing apparatus for forming dots on a board of a large dimensional light guiding board by well controlling the shapes, radii and depths of the dots with desired uniformity.

In accordance with one aspect of the present invention, an apparatus for laser processing a board is provided. The apparatus for laser processing a board comprises a chip receiving a first frequency signal to generate a second frequency signal; a laser receiving the first frequency signal to emit a first laser beam; a modulating device receiving the second frequency signal and the first laser beam, and adjusting the first laser beam to emit a second laser beam; and a focus device focusing the second laser beam to emit a third laser beam onto the board for forming plural dots on the board.

In accordance with another aspect of the present invention, an apparatus for laser processing a board is provided. The apparatus for laser processing a board comprises a laser receiving a first frequency signal to emit a first laser beam; a modulating device receiving a second frequency signal and the first laser beam, and adjusting the first laser beam to emit a second laser beam based on the second frequency signal; and a focus device focusing the second laser beam to emit a third laser beam onto the board for forming plural dots on the board.

In accordance with a further aspect of the present invention, an apparatus for laser processing a board is provided. The apparatus for laser processing a board comprises a modulating device receiving a frequency signal and a first laser beam, and adjusting the first laser beam to emit a second laser beam based on the frequency signal; and a focus device focusing the second laser beam to emit a third laser beam onto the board for is forming plural dots on the board.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the is following descriptions of preferred embodiments of this invention are presented herein for the purposes of illustration and description only; it is not intended to be exhaustive or to be limited to the precise form disclosed.

In order to solve the drawbacks of the conventional techniques, a laser processing apparatus is provided in the present invention for forming dots on the surface of a large dimensional light guiding board by well controlling the appearance, radius and depth of each dot with excellent uniformity, wherein the board is made of a material of poly(methyl methacrylate) (PMMA).

Figure 2:
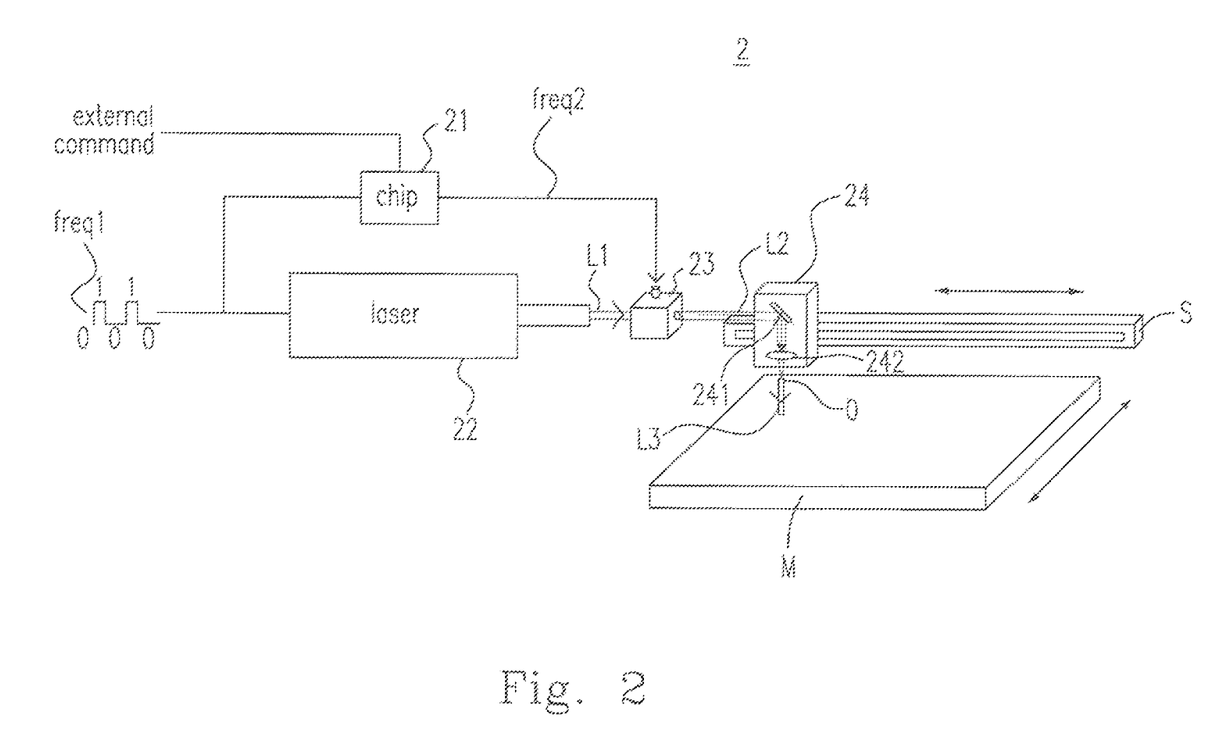
FIG. 2 is the schematic diagram showing the appearance and structure of a laser processing apparatus in one embodiment of the present invention.

As shown in FIG. 2, the appearance and structure of a laser processing apparatus in one embodiment of the present invention is illustrated. In FIG. 2, the laser processing apparatus 2 includes a processing chip 21 with a program for modulating the pulse widths, a laser 22, a modulating device 23 and a focus device 24.

A clock generator (not shown in the Figures) or the like is required to generate a frequency signal including a clock signal for triggering the chip 21 and several electronic elements inside the laser 22.

Figure 3:
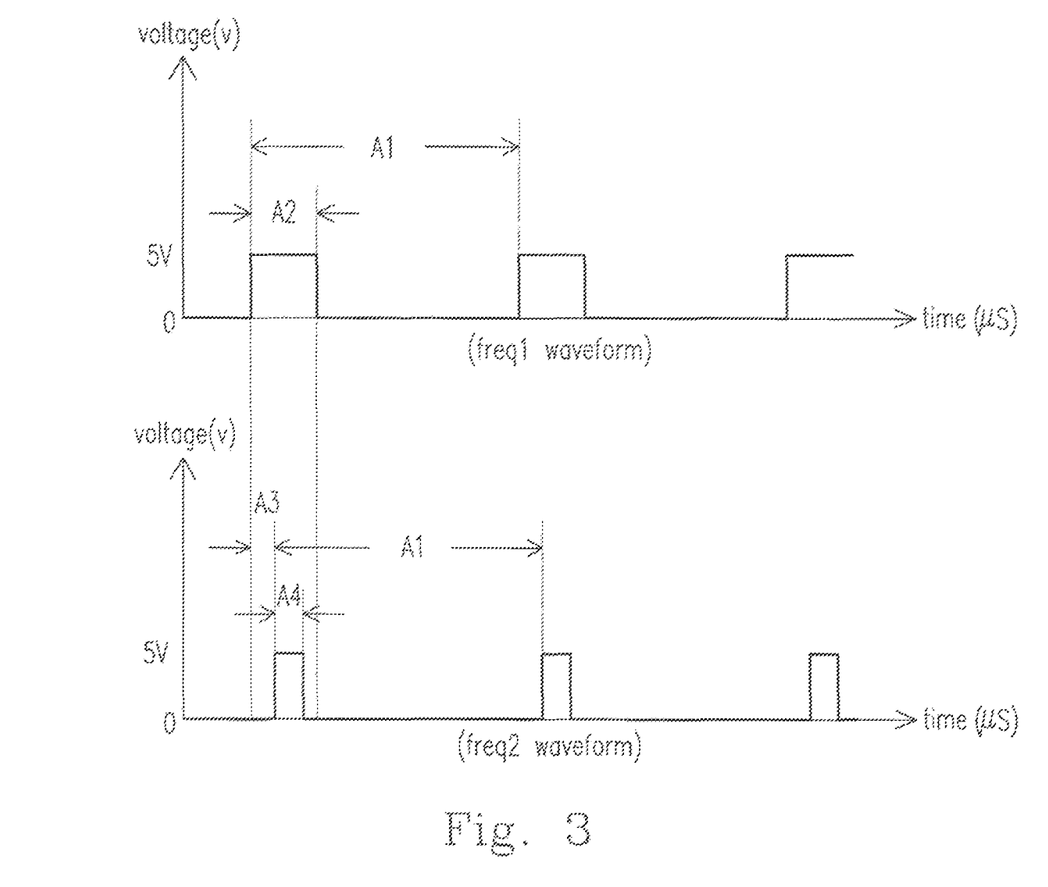
FIG. 3 is the schematic diagram showing waveforms of frequency signals of a laser processing apparatus in one embodiment of the present invention.

The first frequency signal freq1, e.g. 10 k Hz frequency and 10 µs pulse width, with a series of high states denoted as "1" and low states denoted as "0" in FIG. 2 generated from a clock generator is input to the chip 21 and the laser 22, e.g. impulse-type $CO_2$ laser in this embodiment or other continuous-type laser. The impulse-type $CO_2$ laser is triggered by the high state of the first frequency signal freq1 so as to emit a first laser beam L1 with the wavelength of 9.2 to 10.6 µm and the energy of 20 W. Synchronically, the chip 21 receives the first frequency signal freq1 generated by the clock generator and treats this freq1 as a reference signal. At the same time, the chip 21 receives an external command with the information regarding the turn-on or turn-off timing, which is predetermined by a user, from a computer. As shown in FIG. 3, the waveforms of the frequency signals of a laser processing apparatus in one embodiment of the present invention are illustrated. In FIG. 3, A1 shows a periodical waveform of the first frequency signal freq1, A2 shows the waveform in the width of the high state of the first frequency signal freq1, A3 shows a time interval of a predetermined turn-off time for the chip 21, and A4 shows a time interval of a predetermined turn-on time for the chip 21. The pulse-width modulating program inside the chip 21 starts to generate a second frequency signal freq2 based on the external command associated with the information of the turn-on or turn-off timing for the chip 21, when the received first frequency signal freq1 is situated in a positive-edge-triggered condition. The pulse width of the second frequency signal freq2 can be larger than, smaller than or equal to that of the first frequency signal freq1. For example, the frequency can be 10 k Hz. The pulse width of the second frequency signal can define the periodical waveform thereof.

In details, as soon as A2 is situated in the high state of the pulse width of the first frequency signal freq1, the pulse-width modulating program inside the chip 21 starts to control the second frequency signal freq2 to be kept in a turn-off condition for a time interval A3 and then to be kept in a turn-on condition for a time interval A4. The second frequency signal freq2 generated by the chip 21 contains a series of high states A4 and low states A3 as shown in FIG. 3.

Refer to FIG. 2. Two receiving ends of the modulating device 23 receive the second frequency signal freq2 generated by the chip 21 and the first laser beam L1 emitted by the impulse-type $CO_2$ laser 22, respectively. Meanwhile, the modulating device 23 adjusts the energy for the first laser beam L1 so as to output an adjusted second laser beam L2 according to the current pulse width of the second frequency signal freq2. That is to say, the modulating device 23 intercepts a predetermined section of the first laser beam L1 according to the pulse width of the second frequency signal freq2 generated by the chip 21. In details, the wider the pulse width of the second frequency signal freq2, the wider the intercepted predetermined section of the first laser beam L1 from the laser 22, the larger the accumulated energy of the output adjusted second laser beam L2 from the modulating device 23, and vice versa.

The adjusted second laser beam L2 emitted by the modulating device 23 is output to a focus device 24, which includes a reflective mirror 241 with an incident angle larger than zero for reflecting light and a focus lens 242 for focusing light. The focus device 24 is installed in a movable platform S, which is disposed above a board M and can move along a horizontal direction. Meanwhile, the adjusted second laser beam L2 output by the modulating device 23 is reflected by the reflective mirror 241 to change the transmission direction of the second laser beam L2, and is focused on a point O in an optical axis by the focus device 242. A focus laser beam L3 from the focus point O of the focus device 24 disposed on the movable platform S is output onto the surface of the board M. The dots are formed by the focus laser beam L3 sequentially along the horizontal direction, i.e. right to left or left to right in FIG. 2. After the focus laser beam L3 completes the formation of the dots in the horizontal direction, that is, a row of dots have been formed, the board M is moved by a step along a direction perpendicular to the horizontal direction. Then, the focus laser beam L3 from the focus point O of the focus device 24 provides the energy to form dots in another horizontal direction, that is another row of dots are formed. The same way continues until all the required dots are formed on the surface of the board M to form a dot pattern.

Figure 4A:
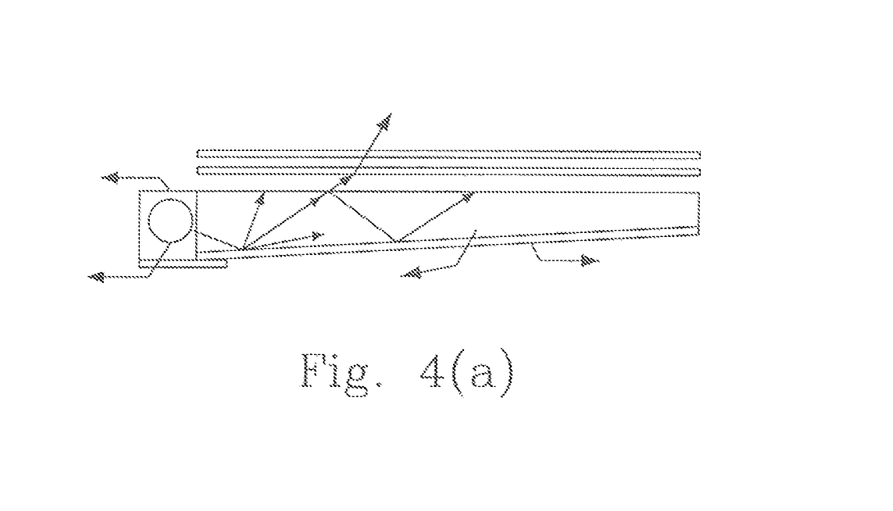
FIGS. 4(a) and 4(b) are the schematic diagrams showing the appearances and structures of the light guiding boards (larger than 37 inch size) with single-side lighting and dual-side lighting, respectively, in some embodiments of the present invention.
Figure 4B:
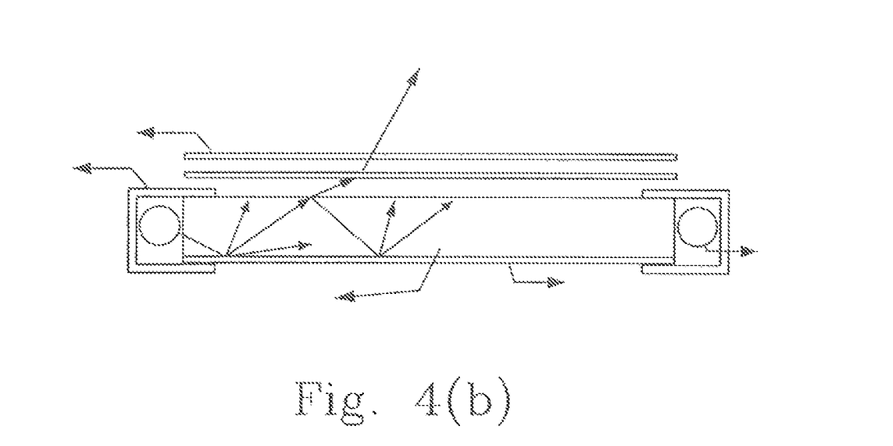

As shown in FIGS. 4(*a*) and 4(*b*), the cross-sectional views of the light guiding boards, especially for the screen size larger than 37 inch, with a single-side lighting and dual-side lighting are illustrated, respectively. In FIGS. 4(*a*) and 4(*b*), since the appearance, radius and depth of every dot on the surfaces of the boards have excellent uniformity, the light incident into the light guiding board made by e.g. PMMA is reflected and dispersed by the dots to deviate from the internal broadcast of the light caused by the total reflection within the board and then comes out of the board. Therefore, the light form the light source, e.g. LED bar or cold cathode fluorescent lamp (CCFL), is reflected and dispersed by all the dots on the board to form a very uniform plane light source, so the luminance all over the board can be quite uniform.

The dots are formed on the board M by the focus laser beam L3 from the focus point O of the focus device 24, so the appearance, radius and depth of each dot on the board M are determined according to the pulse width in the high state of the second frequency signal freq2 generated by the chip 21.

Figure 5:
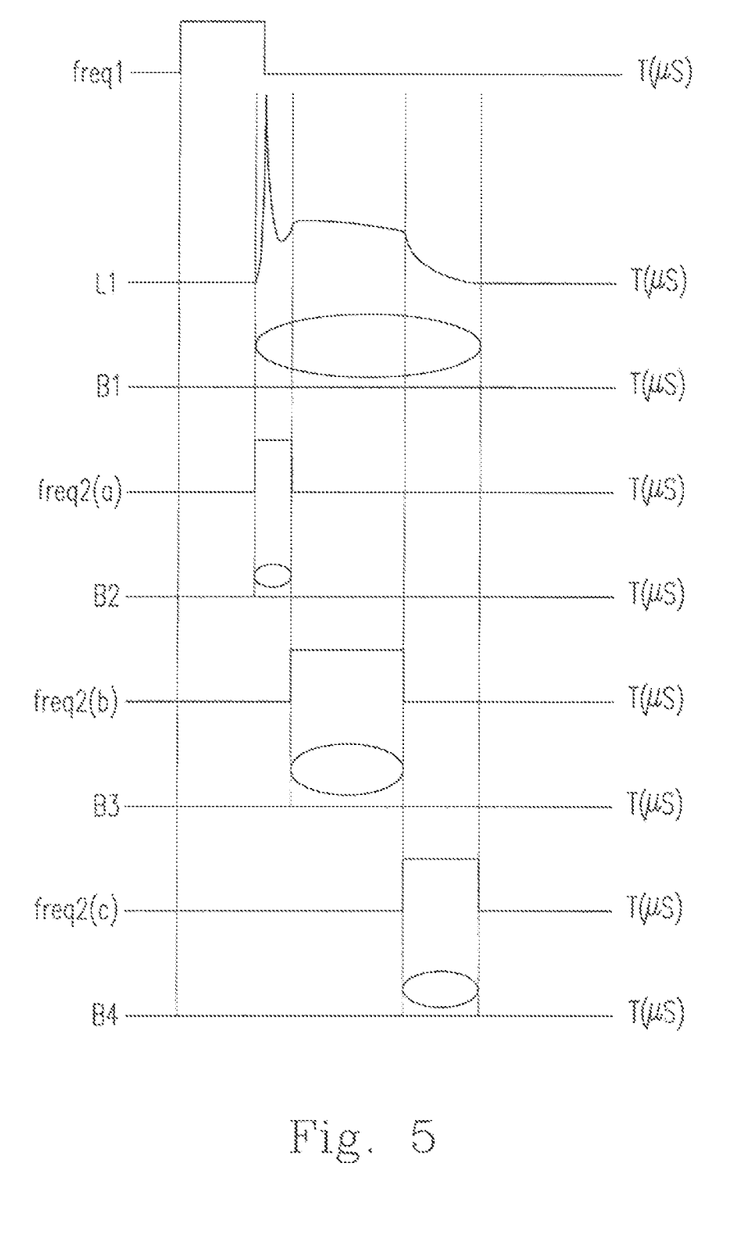
FIG. 5 is the schematic diagram showing the size, including appearance, radius and depth, of a dot adjusted based on the width of the intercepted predetermined section of the laser beam.

As shown in FIG. 5, the size, i.e. appearance, radius and depth, of each dot is adjusted according to the width of the intercepted predetermined section of the first laser beam L1. That is to say, the wider the pulse width in the high state of the adjusted second frequency signal freq2, the larger the accumulated energy of the adjusted second laser beam L2 output by the modulating device, the larger the accumulated energy of is the focus laser beam L3 output by the focus device, the larger the size of the dot formed on the surface of the board, and vice versa. In FIG. 5, when the pulse width of the second frequency signal freq2 is the width (a) of the intercepted predetermined section of the first laser beam L1, shown as a pulse of freq2(*a*), the dot B2 formed there has a small size, including radius and depth. When the pulse width of the second frequency signal freq2 is the width (b) of the intercepted predetermined section of the first laser beam L1, shown as a pulse of freq2(*b*), the dot B3 formed there has a large size, including radius and depth. When the pulse width of the second frequency signal freq2 is the width (c) of the intercepted predetermined section of the first laser beam L1, shown as a pulse of freq2(*c*), the dot B4 formed there has a medium size, including radius and depth, between the sizes of the dot B2 and the dot B3. The dot B1 is formed based on the pulse width of the non-intercepted first laser beam L1 and has the ellipse shape approximately.

When the wavelength of the laser beam emitted from the pulse-type $CO_2$ laser is in a range of 9.2 to 10.6 μm with the energy of about 20 W, the radius of each dot formed on the board by this laser beam is in a range of 25 to 125 μm.

To sum up, the present invention provides the following advantages. The size of each dot formed on the surface of the board can be well adjusted based on the width of the intercepted predetermined section of the laser beam so as to adjust the brightness in the place near the light source and to compensate the brightness insufficiency on the edge, and thus the light guiding board with excellent uniformity can be successfully designed and produced.

Moreover, the laser processing apparatus proposed in the is present invention can provide the great benefit for customized products with the following reasons. As the panel size is increased, especially for the size larger than 37 inch, the size of the light guiding board used therein is increased. Meanwhile, the size of each dot formed on the surface of the board can be well adjusted to be larger by simply modulating the pulse width in the high state of the second frequency signal generated by the chip to be wider. This efficacy cannot be reached by any of the techniques of the current printed or non-printed light guiding boards.

Some embodiments of the present invention are described in the followings.

1. An apparatus for laser processing a board, comprising a chip receiving a first frequency signal to generate a second frequency signal; a laser receiving the first frequency signal to emit a first laser beam; a modulating device receiving the second frequency signal and the first laser beam, and adjusting the first laser beam to emit a second laser beam; and a focus device focusing the second laser beam to emit a third laser beam onto the board for forming plural dots on the board.

What is claimed is:

1. An apparatus for laser processing a light guide board, comprising:
   a chip directly receiving a first frequency signal and an external command both to generate a second frequency signal having a pulse width determined by the external command;
   a laser device directly receiving the first frequency signal to emit a first laser beam;
   a modulating device directly receiving the second frequency signal and the first laser beam, and adjusting the first laser beam to emit a second laser beam based on the pulse width of the second frequency; and
   a focus device focusing the second laser beam to emit a third laser beam onto the light guide board for forming plural dots sequentially along a horizontal path on the light guide board,
   wherein the modulating device intercepts a predetermined time section of the first laser beam based on the pulse width of the second frequency signal to generate the second laser beam.

2. An apparatus of claim 1, wherein the laser is a $CO_2$ laser having a laser beam wavelength in a range of 9.2 to 10.6 microns.

3. An apparatus of claim 1, wherein the focus device comprises a reflective mirror and a focus lens.

4. An apparatus of claim 1, further shifted by a movement perpendicular to the first horizontal path, and scanned along a second horizontal path parallel to the first horizontal path for forming the plural dots on the second horizontal path.

5. An apparatus of claim 1, wherein the light guide board is a backlight board, and comprises a poly(methyl methacrylate).

6. An apparatus of claim 1, wherein each of the dots has a radius in a range of 25 to 125 microns, and reflects a light from a backlight source.

7. An apparatus of claim 1, wherein the second frequency signal further has a high state and a low state, the pulse width is defined by the high state, the predetermined time section has a predetermined pulse width which corresponds to the pulse width, and each of the dots has a size to be adjusted based on the predetermined pulse width.

8. An apparatus of claim 1, wherein the chip generates the second frequency signal according to a pulse-width modulation program to have a high state defining the pulse width and a low state, and receives the external command to modify the pulse-width modulation program so as to control the pulse width and adjust the predetermined time section to an adjusted predetermined section according to the pulse width.

9. An apparatus of claim 1, wherein the second frequency signal has one of pulse widths equal to and smaller than that of the first frequency signal.

10. An apparatus for laser processing a light guide board, comprising:
    a laser device receiving a first frequency signal to emit a first laser beam;
    a modulating device receiving a second frequency signal having a pulse width and the first laser beam, and adjusting the first laser beam to emit a second laser beam based on the second frequency signal, wherein the first frequency signal is a periodical signal having a positive edge trigger and the second frequency signal is generated by referring to the positive edge trigger of the first frequency signal; and
    a focus device focusing the second laser beam to emit a third laser beam onto the light guide board for forming 2. An apparatus for laser processing a board, comprising a laser receiving a first frequency signal to emit a first laser beam; a modulating device receiving a second frequency signal and the first laser beam, and adjusting the first laser beam to emit a second laser beam based on the second frequency signal; and a focus device focusing the second laser beam to emit a third laser beam onto the board for forming plural dots on the board.

3. An apparatus for laser processing a board, comprising a modulating device receiving a frequency signal and a first laser beam, and adjusting the first laser beam to emit a second laser beam based on the frequency signal; and a focus device focusing the second laser beam to emit a third laser beam onto the board for forming plural dots on the board.

4. An apparatus of any one of the above embodiments, wherein the laser is a $CO_2$ laser having a laser beam wavelength in a range of 9.2 to 10.6 micron.

5. An apparatus of any one of the above embodiments, wherein the focus device comprises a reflective mirror and a focus lens.

6. An apparatus of any one of the above embodiments, wherein the third laser beam is scanned along a first horizontal path on the board for forming the plural dots on the first horizontal path, shifted by a movement perpendicular to the first horizontal path, and scanned along a second horizontal path parallel to the first horizontal path for forming the plural dots on the second horizontal path.

7. An apparatus of any one of the above embodiments, wherein the board is a backlight board, and comprises a poly(methyl methacrylate).

8. An apparatus of any one of the above embodiments, wherein each of the dots has a radius in a range of 25 to 125 micron, and reflects a light from a backlight source.

9. An apparatus of any one of the above embodiments, wherein the modulating device intercepts a predetermined section on the first laser beam based on the second frequency signal to generate the second laser beam.

10. An apparatus of any one of the above embodiments, wherein the predetermined section has a predetermined pulse width, and each of the dots has a size to be adjusted based on the predetermined pulse width.

11. An apparatus of any one of the above embodiments, wherein the chip generates the second frequency signal according to a pulse-width modulation program, and receives an external command to modify the pulse-width modulation program so as to adjust the predetermined section to an adjusted predetermined section.

12. An apparatus of any one of the above embodiments, further comprising a processing unit generating the second frequency signal based on a pulse-width modulation program and the first frequency signal, and receives an external command to modify the pulse-width modulation program, so as to adjust the predetermined section to an adjusted predetermined section.

13. An apparatus of any one of the above embodiments, wherein the second frequency signal has one of pulse widths equal to and unequal to that of the first frequency signal.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

plural dots of uniform appearance, radius and depth sequentially along a horizontal path on the light guide board, wherein the modulating device intercepts a predetermined time section of the first laser beam based on the pulse width of the second frequency signal to generate the second laser beam.

11. An apparatus of claim 10, wherein the laser is a $CO_2$ laser having a laser beam wavelength in a range of 9.2 to 10.6 microns.

12. An apparatus of claim 10, wherein the focus device comprises a reflective mirror and a focus lens.

13. An apparatus of claim 10, wherein the third laser beam is further shifted by a movement perpendicular to the first horizontal path, and scanned along a second horizontal path parallel to the first horizontal path for forming the plural dots on the second horizontal path.

14. An apparatus of claim 10, wherein:

the light guide board is a backlight board, and comprises a poly(methyl methacrylate); and each of the dots has a radius in a range of 25 to 125 microns, and reflects a light from a backlight source.

15. An apparatus of claim 10, wherein the predetermined time section has a predetermined pulse width, and each of the dots has a size to be adjusted based on the predetermined pulse width.

16. An apparatus of claim 10, further comprising a processing unit generating the second frequency signal based on a pulse-width modulation program and the first frequency signal, and receives an external command to modify the pulse-width modulation program, so as to adjust the predetermined time section to an adjusted predetermined section.

17. An apparatus of claim 10, wherein the second frequency signal has one of pulse widths equal to and unequal to that of the first frequency signal.

18. An apparatus for laser processing a board, comprising:

a modulating device directly receiving a frequency signal having a pulse width and a first laser beam both, and adjusting the first laser beam to emit a second laser beam based on the frequency signal; and a focus device focusing the second laser beam to emit a third laser beam onto the board for forming plural dots on the board, wherein the modulating device temporally intercepts a predetermined time section of the first laser beam by the frequency signal to generate the second laser beam.

* * * * *